(12) United States Patent
Hara

(10) Patent No.: US 7,990,400 B2
(45) Date of Patent: Aug. 2, 2011

(54) METHOD FOR DISPLAYING IMAGES ON DISPLAY SCREEN

(75) Inventor: Chikashi Hara, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 11/857,058

(22) Filed: Sep. 18, 2007

(65) Prior Publication Data

US 2008/0259097 A1 Oct. 23, 2008

(30) Foreign Application Priority Data

Nov. 16, 2006 (JP) ................................ 2006-309984

(51) Int. Cl.
*G09G 5/14* (2006.01)
(52) U.S. Cl. ........................................................ 345/660
(58) Field of Classification Search .................. 345/660
See application file for complete search history.

(56) References Cited

U.S. PATENT DOCUMENTS

| | | | | | |
|---|---|---|---|---|---|
| 4,608,656 | A | * | 8/1986 | Tanaka et al. ................. | 701/212 |
| 4,796,189 | A | * | 1/1989 | Nakayama et al. ........... | 701/209 |
| 5,083,256 | A | * | 1/1992 | Trovato et al. ................. | 700/56 |
| 5,229,941 | A | * | 7/1993 | Hattori ............................ | 701/26 |
| 5,657,226 | A | * | 8/1997 | Shin et al. ....................... | 701/23 |
| 5,757,359 | A | * | 5/1998 | Morimoto et al. ............. | 345/156 |
| 6,006,161 | A | * | 12/1999 | Katou ............................ | 701/212 |
| 6,011,494 | A | * | 1/2000 | Watanabe et al. ......... | 340/995.14 |
| 6,076,041 | A | * | 6/2000 | Watanabe ..................... | 701/211 |
| 6,415,226 | B1 | * | 7/2002 | Kozak ............................ | 701/210 |
| 6,453,236 | B1 | * | 9/2002 | Aoki .............................. | 701/211 |
| 6,456,934 | B1 | * | 9/2002 | Matsunaga et al. ........... | 701/210 |
| 6,864,807 | B2 | * | 3/2005 | Todoriki et al. ............... | 340/988 |
| 6,868,337 | B2 | * | 3/2005 | Muramatsu .................... | 701/211 |
| 6,978,207 | B2 | * | 12/2005 | Katou ............................ | 701/201 |
| 7,044,372 | B2 | * | 5/2006 | Okuda et al. .................. | 235/384 |
| 7,519,469 | B2 | * | 4/2009 | de Silva et al. ............... | 701/200 |
| 2002/0049533 | A1 | * | 4/2002 | Kusano et al. ................ | 701/209 |

(Continued)

FOREIGN PATENT DOCUMENTS

JP 62288516 12/1987

(Continued)

OTHER PUBLICATIONS

Interaction and modeling techniques for desktop two-handed input Ken Hinckley, Mary Czerwinski, Mike Sinclair; Nov. 1998.*

*Primary Examiner* — Javid A Amini
(74) *Attorney, Agent, or Firm* — Herman Rodriguez; David A. Mims; Robert C. Rolnik

(57) ABSTRACT

Method, apparatus and program product for efficient display of an image at a targeted position in an image on a display screen by displaying, on the display screen, an image on which the targeted position is not displayed; setting a first position specified on the image displayed on the display screen, and a second position having a point symmetry with respect to a center of the displayed image; displaying the image while reducing a display magnification of the displayed image to a certain magnification to a degree with which the targeted position can be identified in the image, employing the second position as a center; and displaying the image while enlarging the displayed image to a certain magnification, employing the targeted position or a designated neighboring point as a center on the image obtained after the magnification change.

10 Claims, 4 Drawing Sheets

U.S. PATENT DOCUMENTS

| | | | |
|---|---|---|---|
| 2002/0173906 A1* | 11/2002 | Muramatsu | 701/207 |
| 2003/0060974 A1* | 3/2003 | Miyahara et al. | 701/209 |
| 2003/0122688 A1* | 7/2003 | Niitsuma | 340/995.1 |
| 2006/0229806 A1* | 10/2006 | Forlenza et al. | 701/207 |
| 2006/0247855 A1* | 11/2006 | de Silva et al. | 701/212 |
| 2010/0026649 A1* | 2/2010 | Shimizu et al. | 345/173 |
| 2010/0127994 A1* | 5/2010 | Aono et al. | 345/173 |

FOREIGN PATENT DOCUMENTS

| | | | |
|---|---|---|---|
| JP | 07280577 | | 10/1995 |
| JP | 09042986 A | * | 2/1997 |
| JP | 10133642 | | 5/1998 |
| JP | 2001183151 | | 7/2001 |
| JP | 2002350151 A | * | 12/2002 |
| JP | 2003344058 | | 12/2003 |
| JP | 2005043112 | | 2/2005 |
| JP | 2006146643 | | 6/2006 |
| WO | WO 2006020304 A2 | * | 2/2006 |

\* cited by examiner

METHOD FOR DISPLAYING IMAGES ON DISPLAY SCREEN

FIELD OF THE INVENTION

The present invention generally relates to a method for displaying an image on a display screen. More particularly, the present invention relates to a method for displaying an image at a targeted position on an image, such as a map or the like, displayed on the display screen of a computer or the like.

BACKGROUND

As computer technology has advanced and the use of the Internet has spread, it has become possible to present clear, detailed map images on display screens of computers. In computers, images are usually displayed on computer screens, by implementing various types of image display software (viewer). Map images can be displayed not only on the computer screens, but also on the screens of portable terminals, such as car navigation systems and mobile phones. Further, in CAD systems, images for presenting design information (arrangements and connections) for semiconductor circuits and machines are conventionally displayed on display screens. Furthermore, in optical or electronic microscopes, images of the surface states of micro substances are reproduced on display screens.

These images are displayed while being enlarged or reduced by the operations of operators of respective apparatuses, under the implementation of image display software (viewer). In other words, the displaying range of the image on the display screen can be arbitrarily altered. Now, assume that a map image is displayed on a display screen. Assume that at first the displayed map image is greatly magnified. That is, the map image is enlarged at a certain magnification. In other words, it means that the range (area) of the map displayed on the display screen is narrow. Next, suppose a case wherein the map image is moved from a current position (starting position) on the screen, searching for another targeted position that is currently not visible on the screen.

In this case, conventionally, the following two methods can be employed. According to the first method, the map image displayed on the display screen is sequentially moved, without changing the current magnification, until the targeted position is reached. According to the second method, the image is first displayed at a smaller magnification until the targeted position is displayed on the display screen, and after the targeted position is placed to the center of the map image, the image is enlarged to a certain magnification.

In the case of the first method, the moving of the image must be repeated many times until the targeted position is found. Further, since the targeted position is not always present at a position along the image moving direction, it is necessary to repeat the moving of the image several times, changing the moving direction during the process. Particularly in a case wherein an area for a search (targeted position) is unfamiliar, the repetition tends to be increased.

In the case of the second method, since the magnification is first reduced, the targeted position is easily found on the image after it is reduced. However, when the magnification of the image is reduced (or enlarged), the viewer usually reduces (or enlarges) the image, employing the center of the displayed image as a reference (a virtual center). Therefore, in the case wherein the current position before the image reduction is located in the center of the displayed image, and after the image is reduced, the display area on the side opposite to the direction in which the image map is moved to the targeted position becomes an area that is not actually required to view and is unnecessary. That is, it is not possible to display the image, after the magnification is reduced, of only the area between the current position and the targeted position or a region including that area as a greater part. This applies to a case wherein the magnification of the image including the targeted position is increased. That is, in the case wherein the targeted position is placed at the center of the displayed image, the display area in the enlarged image on the side opposite to the direction in which the map image is moved to the initial current position (starting point) becomes an area that is not actually required to view and is unnecessary. In order to reduce the size of such an unnecessary area, the setup of the center (virtual center) of the magnification change, and the magnification change must be alternately repeated a number of times. This problem arises not only for a map image, but also for a CAD image, a microscope image or the like.

SUMMARY

One object of the present invention is to remove the above described problems of the conventional art, and to efficiently display an image at a targeted position on an image provided on a display screen.

Another objective of the present invention is, in a displayed image for which an operator can arbitrarily change the magnification, to move the image from a current position to a targeted position with a number of procedures as small as possible and to quickly display the image at the targeted position.

According to the present invention, there is provided a method for displaying an image at a targeted position on an image displayed on a display screen, the method comprising the steps of: displaying, on the display screen, an image on which the targeted position is not displayed; setting a first position specified on the image displayed on the display screen, and a second position being a point symmetry with respect to a center of the displayed image; displaying the image while reducing a display magnification of the displayed image to a certain magnification to a degree with which the targeted position can be identified in the image, employing the second position as a center; and displaying the image while enlarging the displayed image to a certain magnification, employing the targeted position or a designated neighboring point as a center on the image obtained after the magnification change.

According to the present invention, there is provided a program product for displaying an image including a targeted position on a display screen of one apparatus selected from the group including a computer, a CAD system, a car navigation system, a portable terminal and a microscope, the program product causing the one apparatus to perform the steps of: displaying, on the display screen, an image on which the targeted position is not displayed; setting a first position specified on the image displayed on the display screen, and setting a second position being a point symmetry with respect to a center of the displayed image; displaying the image while reducing a display magnification of the displayed image to a certain magnification to a degree with which the targeted position can be identified in the image, employing the second position as a center; and displaying the image while enlarging the displayed image to a certain magnification, employing the targeted position or a designated neighboring point as a center on the image obtained after the magnification change.

According to the present invention, in a displayed image for which an operator can arbitrarily change the magnification, when moving the image from the current position to the targeted position, it is possible to move the image with a number of procedures as small as possible, and to quickly display the image at the targeted position. Also, in that case, it is possible to move the image to the targeted position, without displaying the image of an area other than the area between the current position and the targeted position, as far as possible. As a result, the image at the targeted position can be quickly displayed.

DETAILED DESCRIPTION

Figure 1:
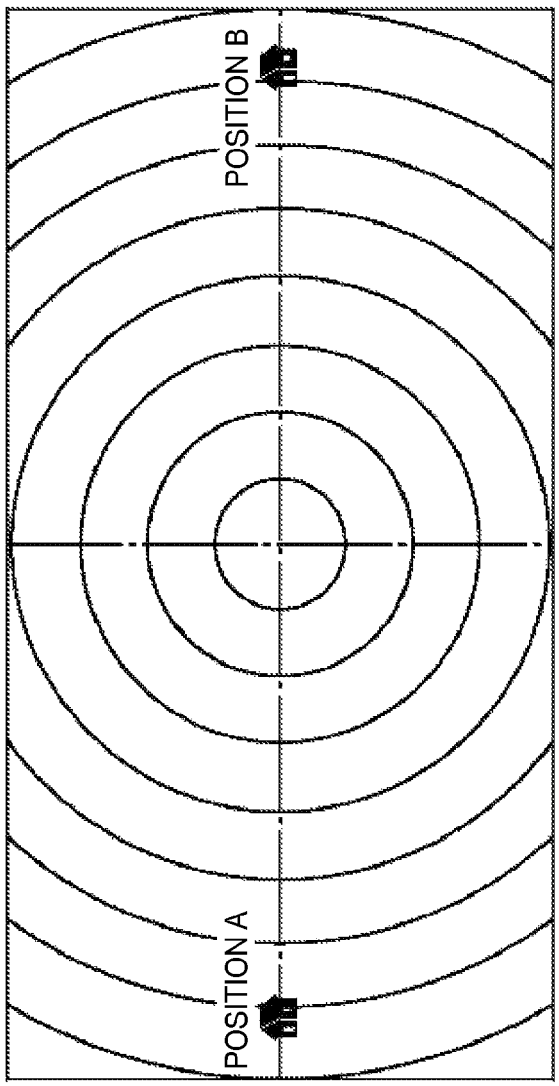
FIG. 1 is a diagram showing a position A (a starting position) and a position B (a targeted position) on a display screen.

The present invention will now be described while referring to drawings. To understand the contents of the invention more clearly, diagrams for conventional methods will also be referred to. FIG. 1 shows one image displayed on the display screen of a computer (PC). The image shown in FIG. 1 is displayed at a smaller magnification. Assume that the image is moved from a position A on the left to a position B on the right in FIG. 1, searching for the range between the two positions.

Figure 2:
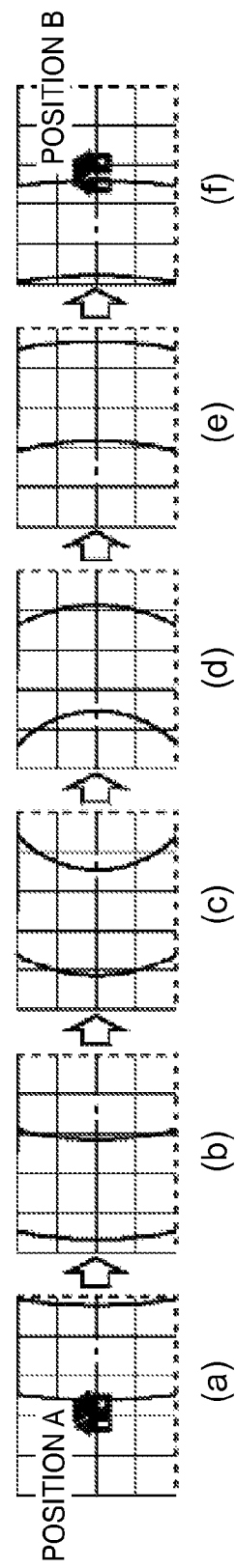
FIG. 2 is a diagram for explaining a conventional method (a first method)

FIG. 2 is a diagram showing the conventional first method described above. The image in FIG. 2 is displayed at a larger magnification. In FIG. 2(a), the position A is located almost in the center of the image. The enlarged image in FIG. 2(a) is moved to the right, using the scroll bar or the slider button of the PC. Then, the displayed image is changed from FIG. 2(b) to FIG. 2(e), and the position B, which is the targeted position, is displayed when the image moves to a position, as shown in FIG. 2(f). While referring to FIG. 2, the position B is reached by performing five movements (scrolls) from FIG. 2(a) to FIG. 2(f). However, in actuality, the position B is not always horizontally located relative to the position A. Therefore, when the image is moved from FIG. 2(b) to FIG. 2(e), the magnification must be reduced, or the image must be moved vertically (perpendicularly). As a result, the number of movements (scrolls) is greater than the number of times required for the ideal case in FIG. 2.

Figure 3:
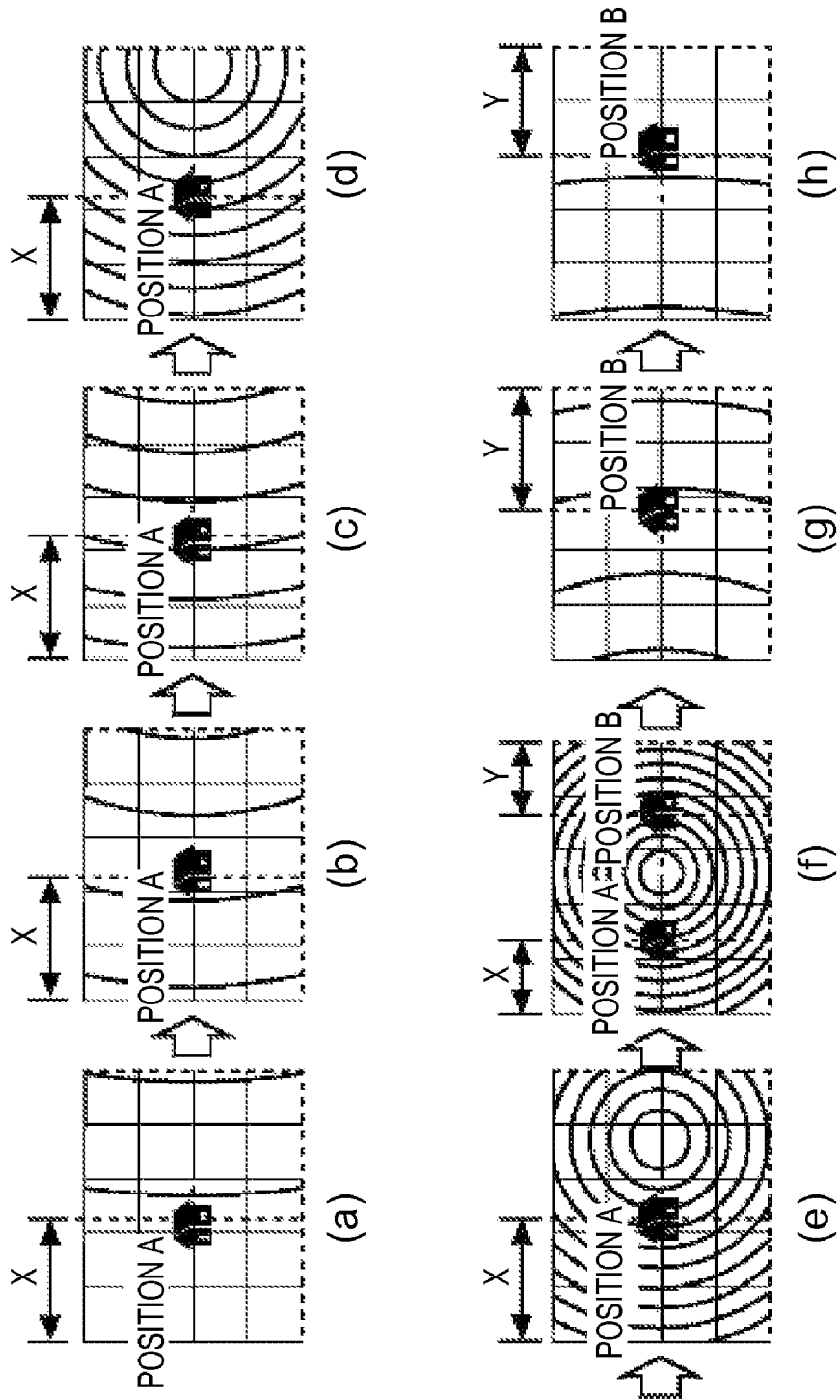
FIG. 3 is a diagram for explaining a conventional method (a second method)

FIG. 3 is a diagram showing the conventional second method described above. FIG. 3(a) shows the enlarged image, as in FIG. 2(a). The position A, which is the starting position, is centrally located in FIG. 3(a), and the magnification is sequentially reduced from FIG. 3(b) to FIG. 3(f). To change the magnification, the mouse pointer of the computer is generally employed to repetitively select the setup for the magnification of the screen. The image on the display is reduced (or enlarged), employing the center of the image as a reference (the virtual center). Therefore, for the images in FIG. 3(b) to FIG. 3(f), an area X on the left side of the position A is an unnecessary area that is not actually required to view. Since the area X is displayed, accordingly, the display of the position B, which is the targeted position, is delayed. That is, the time required to perform the changing of the magnification (the setting for a reduction) is increased until the position B is displayed. Accordingly, the magnification at which the position B can be displayed is lowered, and the image becomes smaller and hard to see. After the position B has been displayed in FIG. 3(f), the image is enlarged, with the position B serving as the center. As shown in FIG. 3(g) and FIG. 3(h), the manner wherein the image having the position B displayed therein is enlarged.

Figure 4:
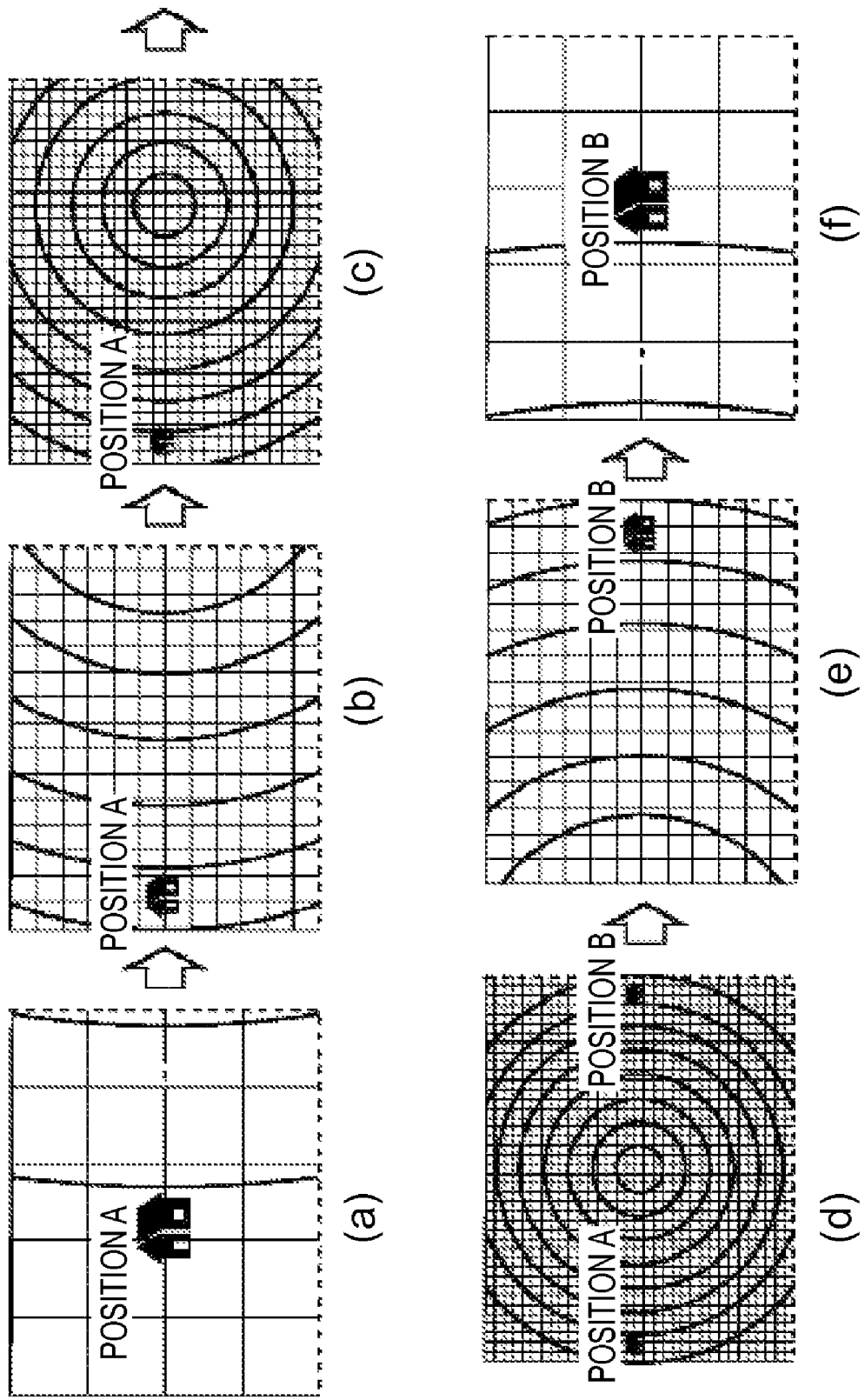
FIG. 4 is a diagram for explaining a method according to the present invention.

FIG. 4 is a diagram for explaining a method according to the present invention. The image in FIG. 4(a) is the same as that in FIG. 2(a) or FIG. 3(a). The position A, which is the starting position, is located in the center of the enlarged image. In FIG. 4(b) to FIG. 4(d), images are shown by reducing the magnification of the image in FIG. 4(a). The difference between the image of the present invention and the image of the conventional art in FIG. 3 is that the position A is located in the left end in each of the images in FIG. 4(b) to FIG. 4(d). When the image is reduced in this manner, the display of the area (X in FIG. 3) on the left side of the position A is avoided, to the extent possible.

Figure 5:
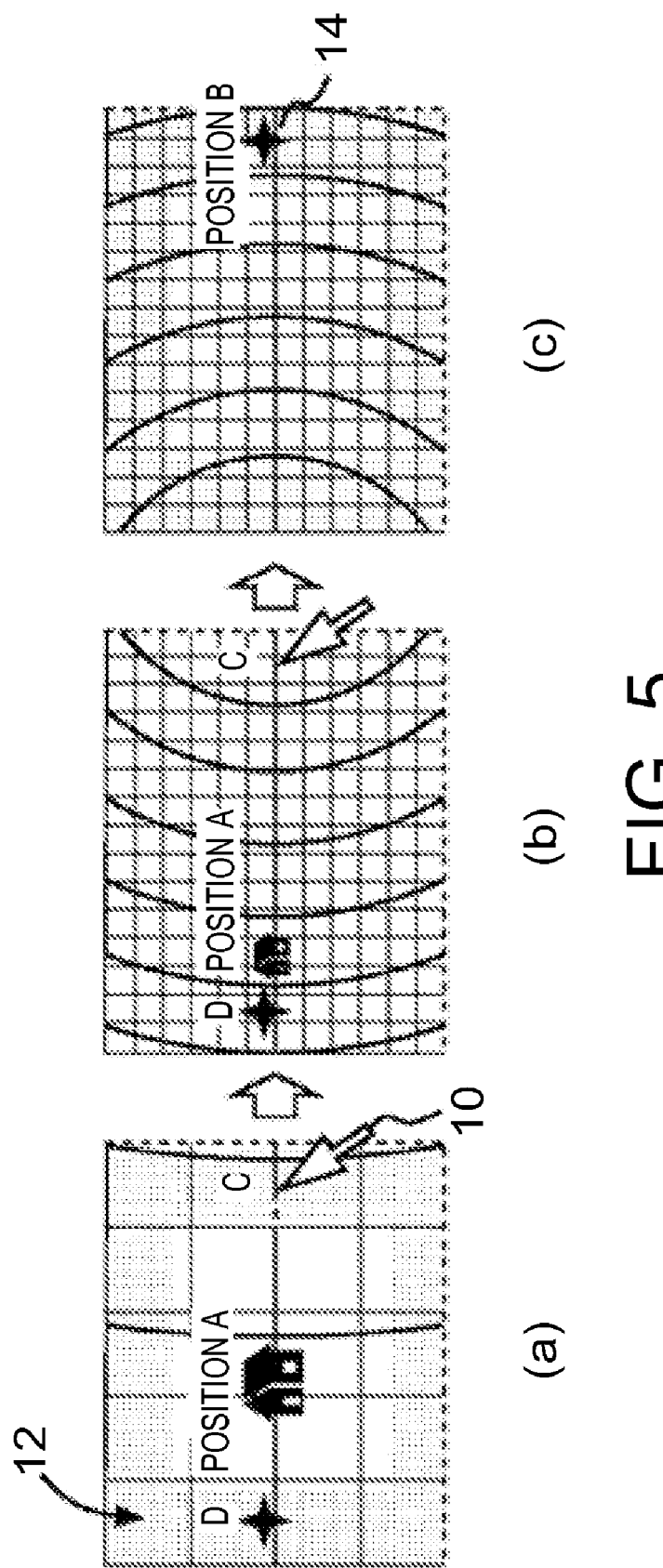
FIG. 5 is a detailed diagram for explaining the method shown in FIG. 4 for the present invention.

FIG. 5 is a detailed diagram showing the change in the image from FIG. 4(b) to FIG. 4(d). In FIG. 5(a), for example, the operator of a computer uses a mouse pointer 10 to select a point C in the right end of the image. Then, a point D, which is a point-symmetry of the point C with respect to the center of the image, is automatically established as the virtual center used for the magnification change, and a cross symbol 12 in FIG. 5(a) denotes the virtual center D. It should be noted, however, that the cross symbol 12 is not actually displayed on the screen, and that the virtual center D is not necessarily defined as a point symmetrical with the point C with respect to the center of the image. An arbitrary point can be employed so long as it is located on the side (left side of the image in FIG. 5) opposite the point C with respect to the center of the image. Therefore, instead of being defined by using the center of the image as a reference, the virtual center D may be defined as an arbitrary point that is near the end of the image (farthest from the point C) along a line that connects the point C to the position A. At this time, it is preferable that the virtual center D be as near as possible to the end of the image (as far from the point C as possible).

While the operator is selecting the point C using the mouse pointer (is clicking on the point C), the magnification of the image is continuously reduced, employing the virtual point D as the center, and the image is moved (changed) as shown in FIG. 4(b) to FIG. 4(d). On the display, it appears that the virtual center D is fixed, and that the designated point C is to be moved to the right on the image. FIG. 5(b) is a diagram showing the state during the process. In this case, the distance between the position A and the virtual center D is reduced (becomes narrower) on the display as the magnification become smaller. As a result, the area (X in FIG. 3) that is displayed to the left of the position A can be reduced. Furthermore, when the point C which is a designated point is moved with the clicking operation maintained, the virtual center D is also (automatically) moved to a position symmetrical with the point C in response to the movement of the point C, and the direction of the magnification change can be altered. As a result, the search for the targeted position can be performed more efficiently.

When the position B which is a targeted position appears on the image, the mouse pointer 10 is moved from the point C to the position B. and is released. However, the cross symbol 14 is not actually displayed on the screen. After the mouse button 14 is released, the virtual center B is moved to the center of the image, and the magnification of the image is increased. Then, the enlarged image at the position B is obtained, as shown in FIG. 4(f). FIG. 4(e) is a diagram showing the state during the enlargement process. The image is enlarged until the same magnification is reached as that of the original image in FIG. 4(a). It should be noted that the enlarging magnification may be arbitrarily changed (set) in accordance with the state of the image.

As is apparent from the comparison of FIG. 3 with FIG. 4, according to the present invention, during the process for moving the image from the position A to the position B. the display of the area on the left side of the position A (X in FIG. 3), which is actually not necessary can be suppressed to a minimal degree. Further, according to the present invention, the number of operations required for the moving process (e.g., using a mouse pointer to click on an object) can be reduced. Also according to the invention, when searching for a targeted position, a reduced number of repetitions can be employed to change (decrease) the magnification of the image.

The method of the present invention can be applied to apparatuses provided with display screens such as personal computers (PCs), car navigation systems or the like. The present invention can be realized, for example, by a map image software which is executed by a PC. The present invention can also be realized by a map image display software that is operated by a portable terminal, such as a mobile phone, for which a display screen is provided. Further, the present invention can be employed not only for the presentation of a map image, but also for an image used to provide design information (e.g., a circuit arrangement or the layout of a semiconductor) for a CAD system. That is, the present invention can also be employed for tracking performed using a circuit arrangement, such as a wiring diagram represented by an enlarged circuit image, from a position A to a distant position B. Moreover, the present invention can also be applied to an apparatus, such as an optical microscope or an electronic microscope, used to provide, for an examination, an enlarged image of the surface of a material. That is, the present invention can be applied to the purpose of tracking from a position A to a position B on an enlarged image of cellular tissue, and in such a case, a display screen, the position of a displayed image, and the arbitrary changing of a display magnification are required. To perform any such operation, an operator uses a mouse pointer when the apparatus employed is a PC, or uses keys or a pen pointer when the apparatus employed is a mobile phone. In any event, an operation is performed while using a method that is inherent to an apparatus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, the program for use by or in connection with the instruction execution system, apparatus, or device. The medium can be an electronic, or semiconductor system, (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. An apparatus comprising a display screen, the apparatus comprising:
   display means for displaying, on the display screen, an image on which a targeted position is not displayed;
   means for setting a first position specified on the image displayed on the display screen, and a second position being a point symmetry of the first position with respect to a center of the displayed image;
   display means for displaying the image holding the first position fixed while reducing a display magnification of the displayed image to a certain magnification to a degree with which the targeted position can be identified in the image to form a reduced image; and
   display means for enlarging the reduced image to another magnification on the display screen, employing a third position as a center on the reduced image, the third position being located in a direction leading away from the first position to the second position beyond the second position, and at least near the targeted position.

2. The apparatus of claim 1, further comprising as a source for the image, one selected from the group consisting of a computer, a computer aided drafting system, a car navigation system, a portable terminal and a microscope.

3. A computer implemented method of searching for a targeted position on an image displayed on a display screen, the method comprising:
   displaying, on the display screen, the image on which the targeted position is not displayed;
   setting a first position specified on the image displayed on the display screen, and a second position being a point symmetry of the first position with respect to a center of the displayed image;
   displaying the image, holding the first position fixed, while reducing a display magnification of the displayed image to a certain magnification to a degree with which the targeted position can be identified in the image to form a reduced image; and
   enlarging the reduced image to another magnification on the display screen, employing a third position as a center on the reduced image, the third position being located in a direction leading away from the first position to the second position beyond the second position, and at least near the targeted position.

4. A computer program product for displaying an image including a targeted position on a display screen of a computer system, the computer program product comprising a computer readable storage device having stored therein computer usable code, wherein said computer usable code when loaded onto the computer system causes the computer system to perform:

displaying, on the display screen, the image on which the targeted position is not displayed;

setting a first position specified on the image displayed on the display screen, and a second position being a point symmetry of the first position with respect to a center of the displayed image;

displaying the image, holding the first position fixed, while reducing a display magnification of the displayed image to a certain magnification to a degree with which the targeted position can be identified in the image to form a reduced image; and enlarging the reduced image to another magnification on the display screen, employing a third position as a center on the reduced image, the third position being located in a direction leading away from the first position to the second position beyond the second position, and at least near the targeted position.

5. A computer implemented method for displaying an image, the computer implemented method comprising:

displaying on a display screen, an image at a first magnification;

receiving a first user input corresponding to a first position;

selecting the first position on the image corresponding to the first user input;

calculating a second position relative to the display screen, symmetrical about a center of the displayed image from the first position;

reducing the image about the second position to form at least one reduced image at a lesser magnification than the first magnification;

receiving a second user input;

responsive to receiving the second user input, calculating a third position on the at least one reduced image, wherein the third position is symmetrical about the center of the at least one reduced image in relation to the second position; and enlarging the at least one reduced image about the third position to form an enlarged image at the first magnification, the third position being located in a direction leading away from the first position to the second position beyond the second position, and at least near the targeted position.

6. The computer implemented method of claim 5, wherein the image comprises map data.

7. The computer implemented method of claim 5, wherein data for the image comprises computer aided design data.

8. The computer implemented method of claim 5, wherein the first user input is a mouse button click corresponding to the first position, and the second user input is a mouse button release.

9. The computer implemented method according to claim 5, wherein the display screen is an apparatus selected from the group consisting of a computer, a computer aided design system, a car navigation system, a portable terminal and a microscope.

10. The computer implemented method according to claim 9, wherein the first position, the second position and the third position are determined in accordance with a position of a pointer displayed on the display screen.

* * * * *